United States Patent
Hotta et al.

(10) Patent No.: US 8,118,357 B2
(45) Date of Patent: Feb. 21, 2012

(54) FRAME STRUCTURE OF SUNROOF APPARATUS

(75) Inventors: Kouichi Hotta, Tochigi (JP); Hajime Katayama, Tochigi (JP); Ayumi Mihashi, Tochigi (JP)

(73) Assignee: Yachiyo Industry Co., Ltd, Saitama (JP)

( * ) Notice: Subject to any disclaimer, the term of this patent is extended or adjusted under 35 U.S.C. 154(b) by 0 days.

(21) Appl. No.: 12/870,171

(22) Filed: Aug. 27, 2010

(65) Prior Publication Data
US 2011/0049938 A1   Mar. 3, 2011

(30) Foreign Application Priority Data

Aug. 27, 2009 (JP) .................................. 2009-196374
Aug. 6, 2010 (JP) .................................. 2010-176861

(51) Int. Cl.
*B60J 7/00* (2006.01)
(52) U.S. Cl. ..................... 296/216.08; 296/213; 296/223
(58) Field of Classification Search ..... 296/216.01–224, 296/213; 74/502.4, 502.5
See application file for complete search history.

(56) References Cited

U.S. PATENT DOCUMENTS 4,749,227 A * 6/1988 Bienert et al. ................ 296/221
6,431,644 B1 * 8/2002 Nagashima et al. .......... 296/223

FOREIGN PATENT DOCUMENTS

JP          4265052 B2     5/2001

* cited by examiner

*Primary Examiner* — Dennis Pedder
(74) *Attorney, Agent, or Firm* — Arent Fox LLP

(57) ABSTRACT

A frame structure of a sunroof apparatus includes a pair of guide rails provided, respectively, on both sides in a width direction of an opening of a vehicle and guiding a movement of a sunroof panel; a frame including a drain extended across the direction and connecting ends of the rails; sliders sliding in the rails, respectively; a drive device installed at the frame and making the sliders slide; cables connecting the sliders and the device and routed so as to cross above the drain; guide pipes covering the cables; and guide pipe grooves depressingly provided at the frame and where the guide pipes are arranged, respectively, wherein protrusion portions protruding outside from outer peripheries of the pipes are provided, and wherein engagement portions where the protrusion portions are engaged are formed in the grooves.

4 Claims, 9 Drawing Sheets

FRAME STRUCTURE OF SUNROOF APPARATUS

CROSS-REFERENCE TO RELATED APPLICATION

This application claims the priority of Japanese Application Nos. JP 2009-196374, filed Aug. 27, 2009 and JP 2010-176861, filed Aug. 6, 2010 the entire specifications, claims and drawings of which are incorporated herewith by reference.

BACKGROUND OF THE INVENTION

1. Field of the Invention

The present invention relates to a frame structure of a sunroof apparatus of a vehicle.

2. Description of the Related Art

As a sunroof apparatus provided in an opening of a roof of a vehicle, for example, a technology described in Japanese Patent No. 4265052 (hereinafter referred to as "JP4265052") (FIG. 2) is known. The sunroof apparatus described in JP4265052 mainly includes a pair of guide rails, a frame for connecting front ends of the guide rails, a sunroof panel moving along the guide rails, a drive device for moving the sunroof panel, and a cable for connecting the drive device and the sunroof panel.

The frame connects the front ends of the pair of the guide rails and is provided with the drive device, the cable, a guide pipe for covering the cable, and the like. Furthermore, the frame where a drain is formed across a width direction of the vehicle plays a role of draining rainwater and the like flowing in the sunroof apparatus.

The cable connects a slider formed in the sunroof panel and the drive device provided on a front end side of the frame and is routed along the opening of the roof from the guide rails to the frame. A part of the cable is routed so as to traverse the drain of the roof. Furthermore, the cable is inserted through cable grooves in the guide rails, and an outer periphery of the cable is covered with the guide pipe, for example, made of a metal in the frame. By covering the cable with the guide pipe, the cable is protected from dust and water and a deflection thereof is prevented.

Here, in the frame of an invention relating to JP4265052 is further formed a support portion (support portion 62 in JP4265052) for supporting the guide pipe. Namely, on a rear end side of the guide pipe of the invention is formed a collar portion (collar portion 82 in JP 4265052) protruding from an outer periphery of the guide pipe; and in the drain of the frame is formed a support portion for locking the collar of the guide pipe.

In joining the guide rails and the frame, after the collar portion of the guide pipe is locked at a depression of the support portion, while the top end of the guide pipe is inserted in a groove portion (groove portion 32d in JP 4265052), the guide rails and the frame are assembled.

With respect to the sunroof apparatus of JP 4265052, because the support portion formed in the frame is provided in the drain, there is a problem that the support portion interrupts drainage from flowing smoothly. Particularly, because the support portion described in JP 4265052 is a plate-like member installed vertically with respect to a flow direction of the drainage, water tends to pool around the support portion.

Furthermore, in joining the frame and the guide rails, because three members of the frame, the guide rails, and the guide pipe have to be assembled at the same time, there is a problem that assembling work is troublesome.

The present invention is created to solve such problems and provides a frame structure of a sunroof apparatus excellent in drainage property and assembling property.

SUMMARY OF THE INVENTION

The frame structure of the sunroof apparatus comprises a pair of guide rails provided on both sides in a width direction of an opening of a vehicle and configured to guide a movement of a sunroof panel; a frame including a drain extended across the width direction of the vehicle and configured to connect ends of the guide rails with each other; sliders attached to the sunroof panel and configured to slide in the guide rails, respectively; a drive device installed at the frame and configured to make the sliders slide; cables configured to connect the sliders and the drive device and to be routed so as to cross above the drain; guide pipes configured to cover the cables, respectively; and guide pipe grooves depressingly provided at the and where the guide pipes are arranged, respectively, wherein protrusion portions configured to protrude outside from outer peripheries of the guide pipes are provided, respectively, and wherein engagement portions with which the protrusion portions are engaged are formed, respectively, in the guide pipe grooves.

According to such a configuration, because the engagement portions for engaging the guide pipes are provided in the guide pipe grooves, respectively, it is not necessary to provide an engagement member in the drain of the frame as conventional. Thus it is possible to prevent a drainage flow in the frame from being interrupted. Furthermore, because only the frame and the guide rails can be assembled in a state of the guide pipes being engaged in the guide pipe grooves in advance, it is possible to enhance an assembling property of the frame and the rails.

Furthermore, fit-in portions configured to insert the cables, respectively, therethrough and to be fitted in ends of the guide rails is preferably formed at regions fronting the guide rails in the frame. According to such a configuration, because the guide rails and the frame can be fitted in through the fit-in portions formed in the frame, it is possible to further enhance the assembling property of the frame and the rails.

Furthermore, tubular portions configured to cross above the drain and to insert the cables, respectively, therethrough are preferably formed in the frame. According to such a configuration, it is possible to cover the outer peripheries of the cables with the tubular portions and to lead the cables to the sides of the guide rails.

Furthermore, in the frame the guide portions configured to guide the cables are preferably formed, respectively, at regions where the cables are exposed from the guide pipes. According to such a configuration, it is possible to easily align the cables in the guide pipes.

According to the frame structure of the sunroof apparatus, it is possible to enhance a drainage property and assembling property thereof.

BEST MODE(S) FOR CARRYING OUT THE INVENTION

Figure 1:
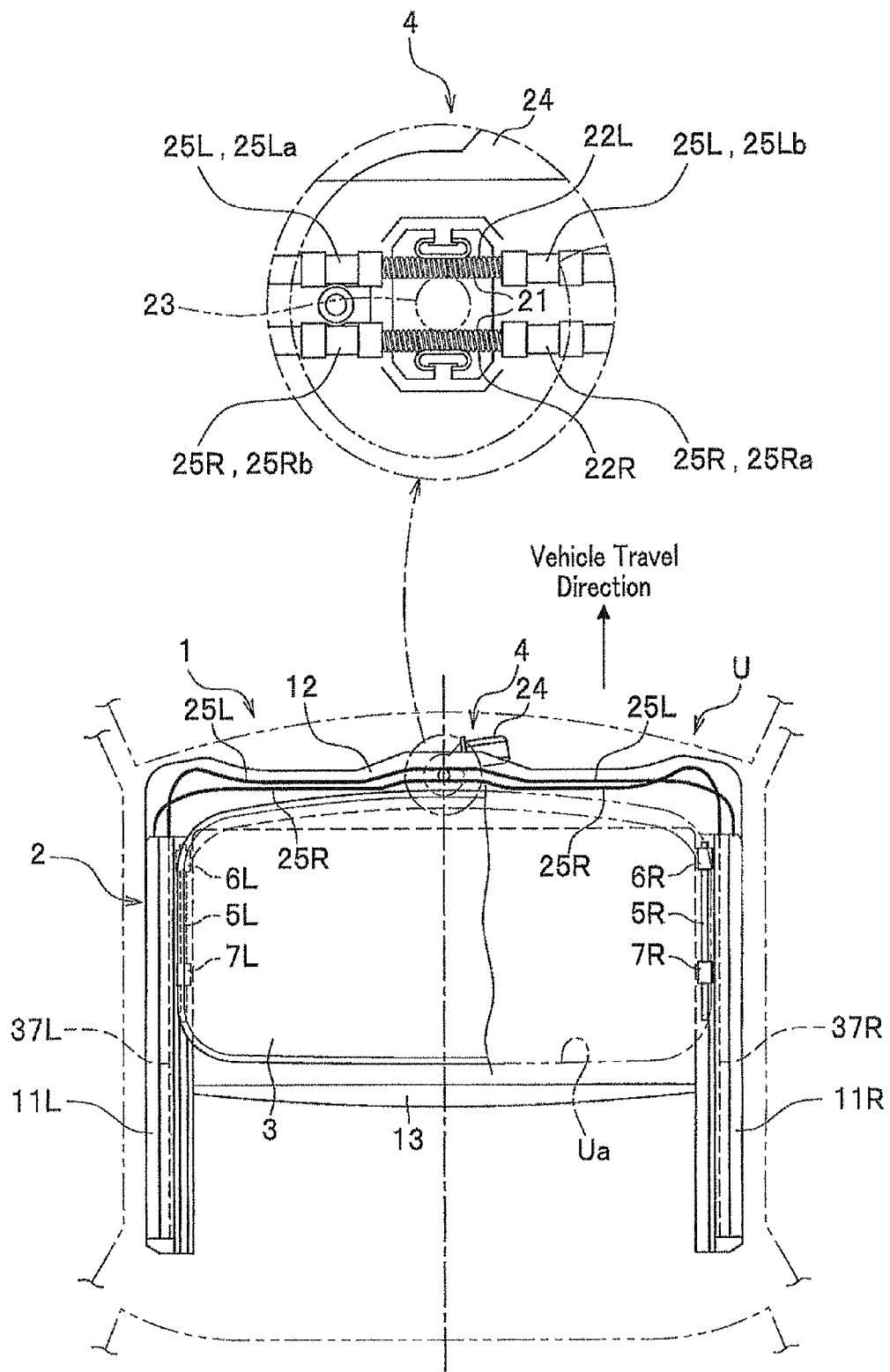
FIG. 1 is a plan view of a sunroof apparatus relating to an embodiment of the present invention.

Here will be described an embodiment of the present invention in detail with reference to drawings as needed. As shown in FIG. 1, a sunroof apparatus 1 of the embodiment is installed in an opening Ua of a roof U of a vehicle. With respect to "up and down," "left and right," and "front and rear," in a description, those will be based on a travel direction of the vehicle. With respect to members provided at left and right as a pair, and members functionally corresponding thereto will be classified by adding "L" or "R" representing "left" or "right" after a same alphanumeric. For example, with respect to guide rails, a guide rail on a left side will be a guide rail 11L; a guide rail on a right side will be a guide rail 11R; and those will be generically named as guide rails 11. Firstly, a general configuration of the sunroof apparatus 1 will be described.

The sunroof apparatus 1 mainly comprises a sunroof frame 2 installed at the roof U so as to surround the opening Ua; a sunroof panel 3 provided so as to slide in front and rear directions of the frame 2, to open and close the opening Ua, and to be able to tilt up or down in the opening Ua; a drive device 4 configured to drive the panel 3 to open and close; a pair of cables 22 (22L, 22R) configured to connect the panel 3 and the device 4; and a pair of guide pipes 25 (25L, 25R) configured to insert the cables 22, respectively, therethrough.

The sunroof frame 2 comprises the left and right guide rails 11L, 11R installed, respectively, on both sides in a width direction of the opening Ua of the vehicle and extending in the front and rear directions of the vehicle; a front frame 12 configured to connect front ends of the guide rails 11L, 11R; and a center frame 13 configured to connect intermediate portions of the rails 11L, 11R. In the left and right guide rails 11L, 11R, across the whole lengths of the rails 11L, 11R, are respectively formed cable grooves 37L, 37R configured to guide the left and right cables 22L, 22R described later.

In the sunroof panel 3 are formed panel brackets 5L, 5R along left and right edges thereof; and in the brackets 5L, 5R are formed a pair of left and right front sliders 6L, 6R and a pair of left and right rear sliders 7L, 7R. The front sliders 6L, 6R and the rear sliders 7L, 7R are formed so as to be slidable in the guide rails 11. The rear sliders 7L, 7R are connected to the panel brackets 5 through a well-known cam mechanism, tilt the sunroof panel 3 by a relative movement with respect to the brackets 5, and move the panel 3 in the front and rear directions by engaging with the brackets 5.

The drive device 4 comprises, as shown in FIG. 1, a drive gear 23 installed on a lower face of the front frame 12 and configured to engage with gears (driven gears 21) of the both cables 22; and a motor 24 configured to rotate the gear 23 through a reducer not shown.

The cables 22 (22L, 22R), whose one ends are connected to the rear sliders 7L, 7R, respectively, and whose the other ends are connected to the drive device 4, comprise the driven gears 21 made by wire being spirally wound around an outer periphery of a flexible body made of steel. The cables 22 is a push-pull cable configured to push and pull the sunroof panel 3 by driving of the drive device 4. The cables 22 are routed so as to be along an outer periphery of the opening Ua of the roof U. The cables 22 are linearly guided along the cable grooves 37L, 37R in the guide rails 11. On one hand, between the engaged portion of the drive gear 23 and the guide rails 11, the cables 22 are respectively guided by the pair of the guide pipes 25 (25L, 25R) installed at the front frame 12.

Figure 2:
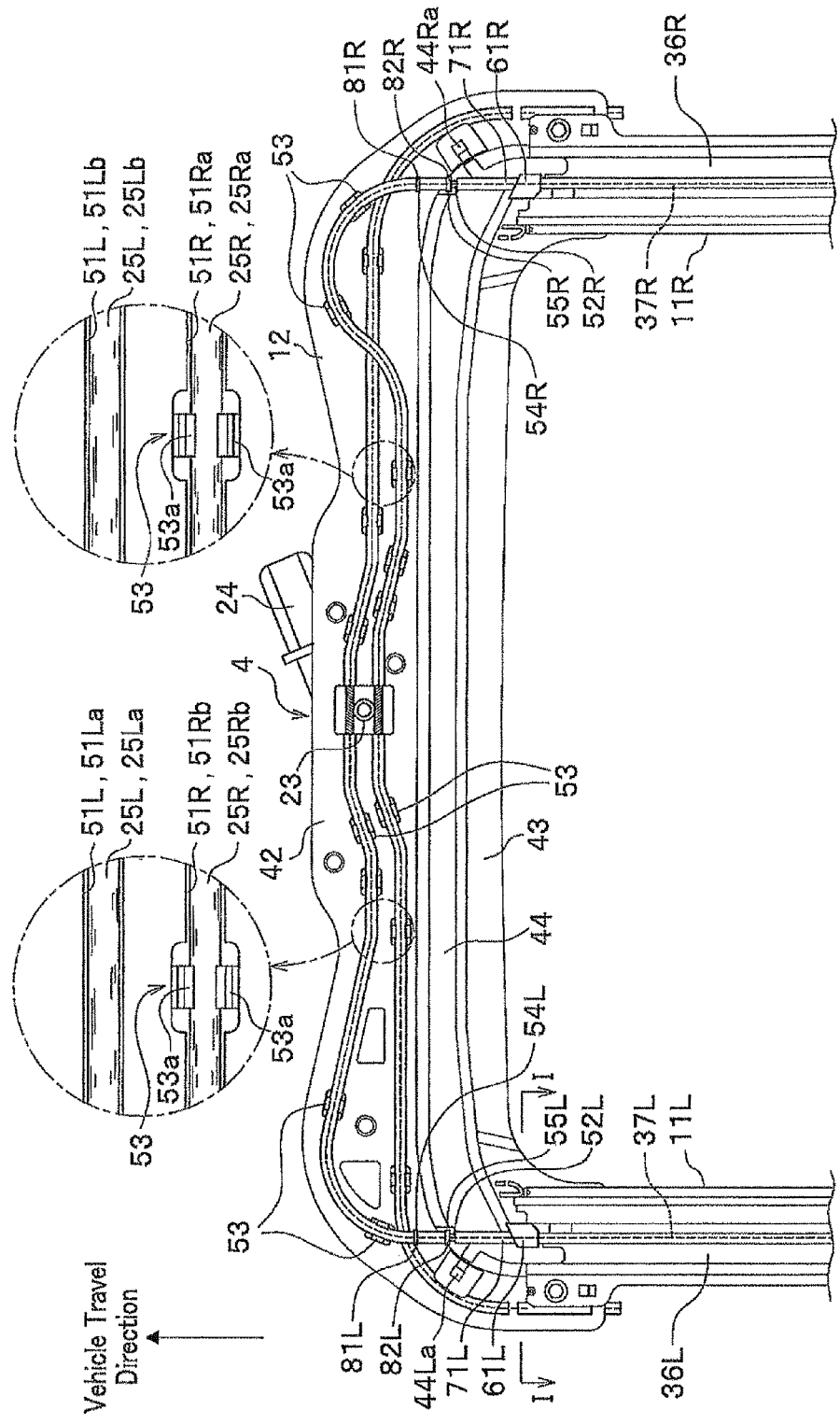
FIG. 2 is a plan view of a front frame and guide rails relating to the embodiment.

The guide pipe 25L is, as shown in FIGS. 1 and 2, a tubular member for covering the cable 22L connecting the drive device 4 and the left rear slider 7L (see FIG. 1). Although the guide pipe 25L is not specifically limited in its raw material, it is made of a resin in the embodiment. The guide pipe 25L comprises a drive-guide-pipe portion 25La configured to lead the cable 22L to a guide rail 11L side; and an idle-guide-pipe portion 25Lb configured to insert an idle end of the cable 22L therethrough.

The guide pipe 25 L is, as shown in FIG. 2, arranged in a guide pipe groove 51L depressingly provided on a front side of the front frame 12. The guide pipe groove 51L comprises a drive-guide-pipe groove portion 51La configured to hold the drive-guide-pipe portion 25La, and an idle-guide-pipe groove portion 51Lb configured to hold the idle-guide-pipe portion 25Lb.

The guide pipe 25 R is, as shown in FIGS. 1 and 2, a tubular member configured to cover the cable 22R connecting the drive device 4 and the right rear slider 7R (see FIG. 1). Although the guide pipe 25 R is not specifically limited in its raw material, it is made of a resin in the embodiment. The guide pipe 25 R comprises a drive-guide-pipe portion 25Ra configured to lead the cable 22R to the guide rail 11R side, and an idle-guide-pipe portion 25Rb configured to insert an idle end of the cable 22R therethrough.

The guide pipe 25 R is, as shown in FIG. 2, arranged in a guide pipe groove 51R depressingly provided on the front side of the front frame 12. The guide pipe groove 51R comprises a drive-guide-pipe groove portion 51Ra configured to hold the drive-guide-pipe portion 25Ra, and an idle-guide-pipe groove portion 51Rb configured to hold the idle-guide-pipe portion 25Rb.

The guide pipes 25 are formed so as to protect the cables 22 from any of dust and water, to regulate a deflection of the cables 22 when those are pushed and pulled by the drive gear 23, and so that the rear sliders 7 move according to a rotation of the gear 23. Then the cables 22L, 22R stand face to face so as to be parallel to each other at the engaged portion of the drive gear 23, and push and pull the rear sliders 7 synchronously according to the rotation of the gear 23.

When the sunroof apparatus 1 is completely closed, it is configured so that an upper face of the sunroof panel 3 and the roof U of the vehicle are same in their level, and when the drive gear 23 is driven and the cables 22 are pushed and pulled, the rear end of the panel 3 is tilted up by the cam mechanism by means of the rear sliders 7 so as to be flipped up more than the roof U or is tilted down, or the panel 3 is operated so as to open and close along with the movements of the sliders 7.

Next will be described a configuration of each member of the embodiment in detail. In addition, because the guide rails 11, the front frame 12, and the guide pipes 25 are approximately formed symmetrically, the left side member thereof will be exemplified.

Figure 3:
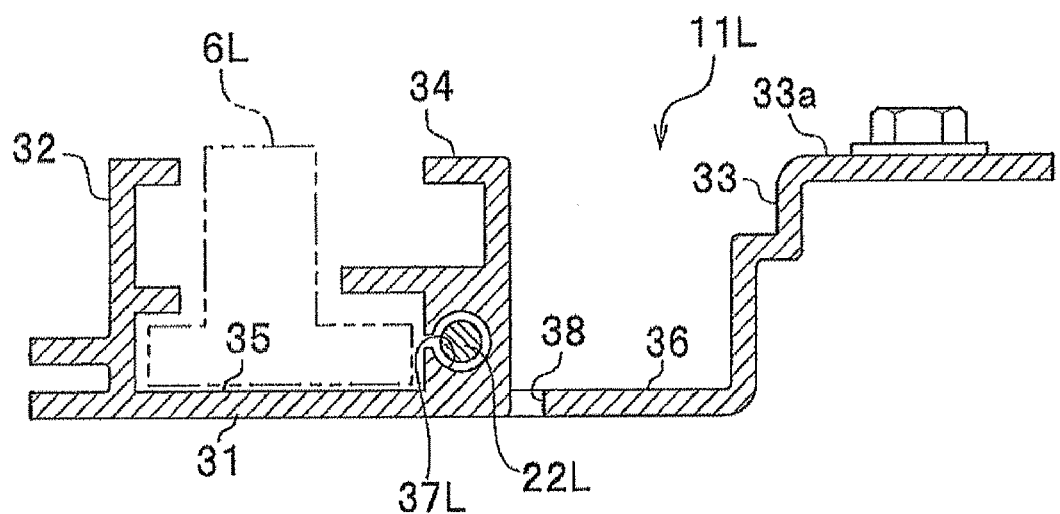
FIG. 3 is a I-I section view of FIG. 2.

The guide rail 11L comprises, as shown in FIG. 3, a bottom portion 31, an inner wall portion 32 and an outer wall portion 33 vertically provided with respect to the portion 31, and a middle wall portion 34 vertically provided at the middle of the portion 31. Between the inner wall portion 32 and the middle wall portion 34 is formed a guide rail groove 35. The front slider 6L and the rear slider 7L slide in the guide rail groove 35. Between the middle wall portion 34 and the outer wall portion 33 is formed a drain 36. The drain 36 is formed so as to collect rainwater and the like flowing from the sunroof panel 3 and to make the rainwater flow to a drain 44 side of the front frame 12 described later. A slit 38 is formed in the bottom portion 31. In the slit 38 is inserted a fit-in portion 61L described later. In the outer wall portion 33 is formed an extension portion 33a extending outside. In the middle wall portion 34 is formed a cable groove 37L inserted through by the cable 22L. In the embodiment, although an extrusion member made of an aluminum alloy is used for the guide rail 11L, the rail 11L is not limited in its raw material and molding method.

Figure 4:
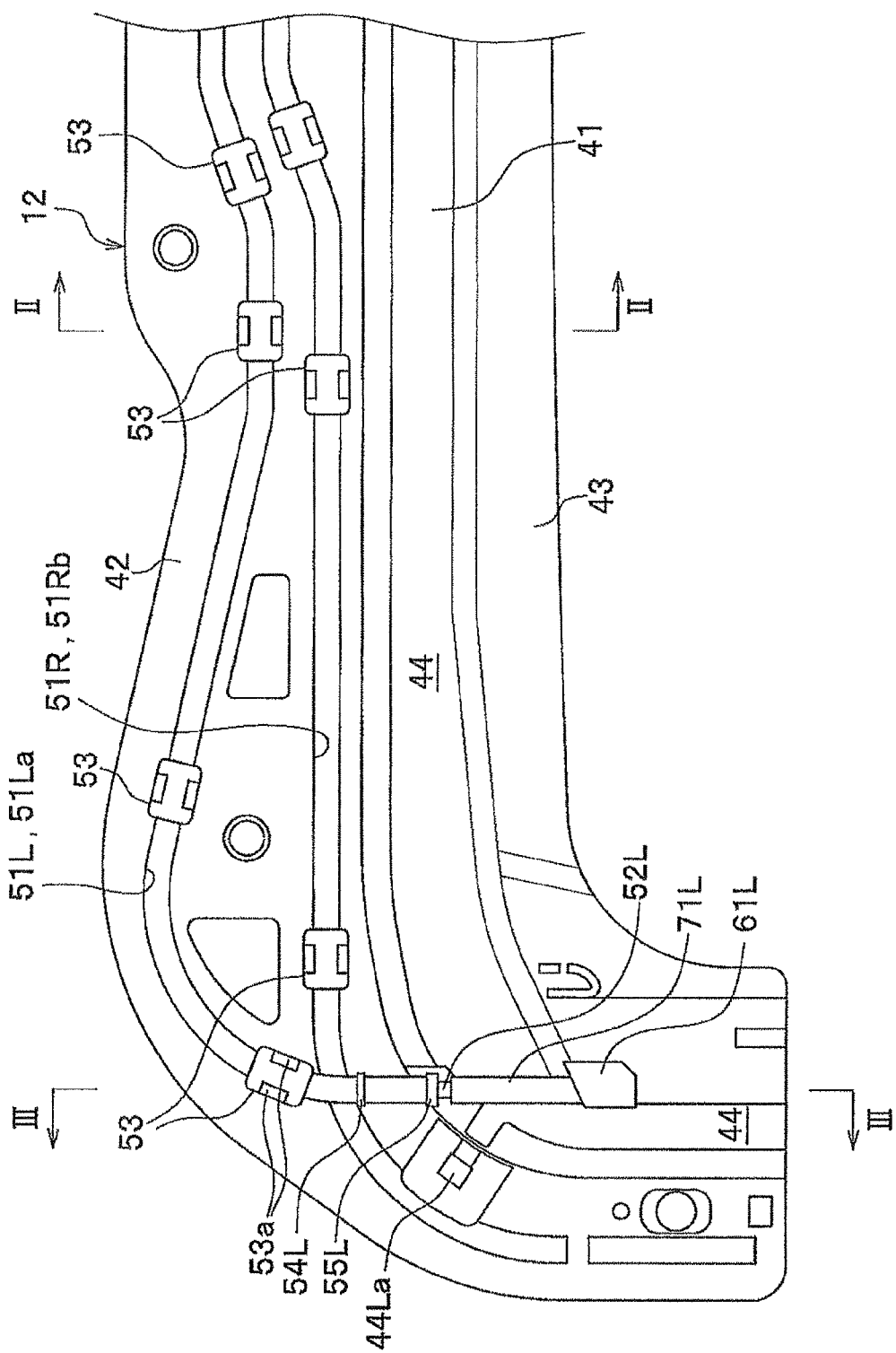
FIG. 4 is an enlarged section view of the front frame relating to the embodiment.

The front frame 12 is, as shown in FIGS. 2 and 4, a member vertically joined to the guide rails 11L, 11R from front sides thereof. In addition, FIG. 4 is an enlarged plan view of the front frame 12 of the embodiment, and shows a state of the guide pipes 25L, 25R being not arranged.

Figure 5:
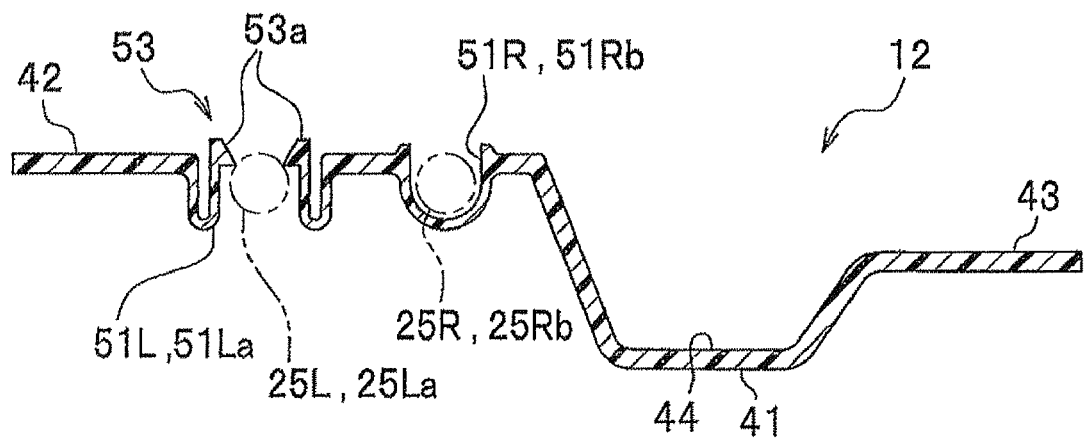
FIG. 5 is a II-II section view of FIG. 4.

The front frame 12 comprises, as shown in FIGS. 4 and 5, a bottom plate portion 41, a front plate-like portion 42 formed on a more front side relative to the portion 41, and a rear plate-like portion 43 formed on a more rear side relative to the portion 41. The bottom plate portion 41 is formed at a position lower by one step than the front plate-like portion 42 and the rear plate-like portion 43. Namely, in the front frame 12 is formed a drain 44 whose bottom face is the bottom plate portion 41. As shown in FIG. 4, the drain 44 is extended across the width direction of the front frame 12 and is also formed continuously in the front and rear directions on both sides of the frame 12. The drain 44 extended in the front and rear directions is formed so as to front the drain 36 (see FIG. 3) of the guide rail 11L. At a corner portion of the front frame 12 is formed an opening 44La opening outside, and drainage collected in the drain 44 is drained outside from the opening 44La.

As shown in FIGS. 4 and 5, at the front plate-like portion 42 are mainly formed the guide pipe groove 51L (drive-guide-pipe groove portion 51La), the guide pipe groove 51R (idle-guide-pipe groove portion 51Rb), and the guide portion 52L which guides the cable 22L.

The drive-guide-pipe groove portion 51La is formed like a U-letter in section view thereof and holds the guide pipe portion 25La of the guide pipe 25L. The drive-guide-pipe groove portion 51La is, while extended in the width direction of the vehicle, bent at the corner portion of the front frame 12 along the corner thereof and is extended nearly before the drain 44 in the front and rear directions of the vehicle. The drive-guide-pipe groove portion 51La comprises a plurality of clip portions 53, and a first engagement portion 54L and a second engagement portion 55L formed, respectively, at regions fronting the drain 44.

The clip portions 53 are, as shown in FIG. 5, regions for clipping and holding the guide pipe 25L. Each of the clip portions 53 comprises a pair of clip claws 53a, 53a on side faces of the drive-guide-pipe groove portion 51La. Because a top end of each clip claw 53a is a free end, when the guide pipe 25L is pushed in any clip claws 53a, 53a, the pipe 25L is clipped. Furthermore, because the guide pipe 25L is only clipped, it is possible to easily remove the pipe 25L from the clip claws 53a, 53a.

Figure 6:
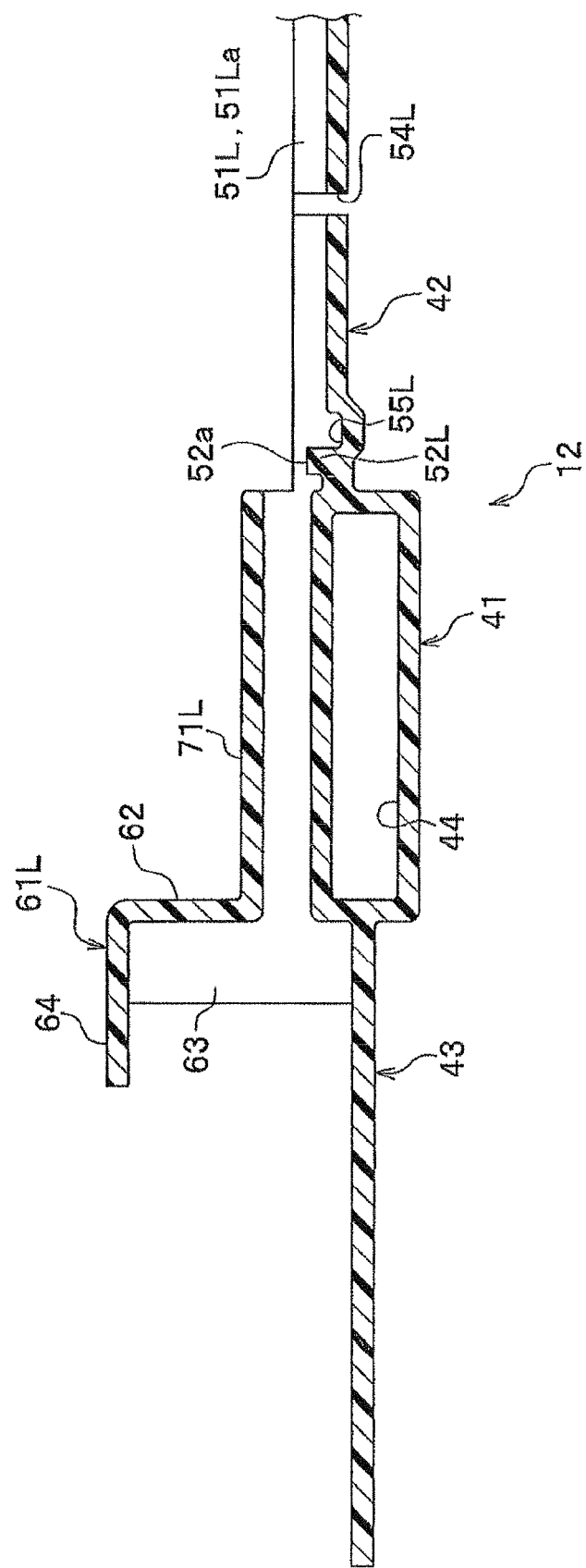
FIG. 6 is a section view of FIG. 4.

The first engagement portion 54L is, as shown in FIGS. 4 and 6, a region where a first protrusion portion 81 of the guide pipe 25L is engaged. The first engagement portion 54L is notched and formed so as to engage with the first protrusion portion 81. The first engagement portion 54L is formed in its plan view between the idle-guide-pipe groove 51Rb and the drain 44. In addition, in the embodiment, although the first engagement portion 54L is notched and formed, it is not limited thereto and may be a mode where the first protrusion portion 81 can be engaged.

The second engagement portion 55L is a region where a second protrusion portion 82L of the guide pipe 25L is engaged. The second engagement portion 55L is formed at a rear end of a side fronting the drain 44 of the drive-guide-pipe groove portion 51La. The second engagement portion 55L is formed wider in its width than the groove width of the drive-guide-pipe groove portion 51La. The second engagement portion 55L is formed in its plan view on a more drain 44 side relative to the first engagement portion 54L. In addition, in the embodiment, although the second engagement portion 55L is formed wider in its width than the groove width of the drive-guide-pipe groove portion 51La., it is not limited thereto and may be a mode where the second protrusion portion 82L can be engaged.

The idle-guide-pipe groove portion 51Rb is, as shown in FIGS. 4 and 5, formed to be a U-letter in its section view and holds the idle-guide-pipe portion 25Rb of the guide pipe 25R. The idle-guide-pipe groove portion 51Rb is, while extended in the width direction of the vehicle, intersects the drive-guide-pipe groove portion 51La on a lower side thereof and is bent at the corner portion of the front frame 12 along the corner thereof. The idle-guide-pipe groove portion 51 Rb comprises a plurality of clip portions 53.

The Guide portion 52L is, as shown in FIGS. 4 and 6, protrudingly provided at the front plate-like portion 42 of the front frame 12. In the embodiment the guide portion 52L is formed on a more drain 44 side relative to the second engagement portion 55L. The guide portion 52L is formed to be rectangular in its side section view and an upper face 52a thereof is formed at a position higher than the bottom face of the drive-guide-pipe groove portion 51La. The guide portion 52L is a region for contacting an exposed cable 22L with the upper face 52a and aligning the cable 22L with respect to the guide pipe 25L.

In the embodiment, although the front frame 12 is made of a resin and formed by an injection molding, it is not limited in its raw material and molding method.

Figure 7:
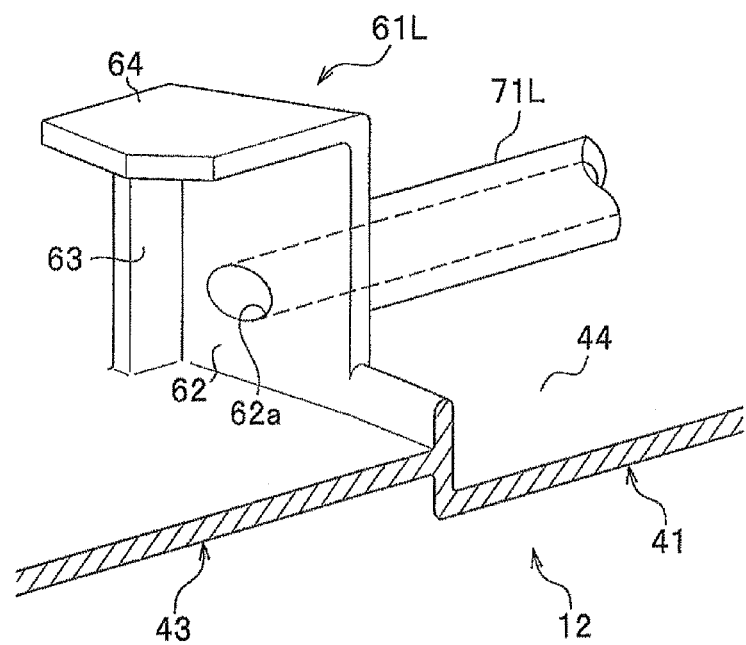
FIG. 7 is a perspective view of a fit-in portion relating to the embodiment.

As shown in FIGS. 4, 6, and 7, the fit-in portion 61L is formed at the rear plate-like portion 43. The fit-in portion 61L comprises a first vertically provided portion 62 provided vertically with respect to the rear plate-like portion 43, a second vertically provided portion 63 vertical to the portion 62, and an upper cover 64 configured to continue from the portions 62 and 63 and provided thereon. A penetration hole 62a, which communicates with a tubular portion 71L described later, is provided in the first vertically provided portion 62. The cable 22L is inserted through the penetration hole 62a. A height from the rear plate-like portion 43 to the upper portion 64 is formed approximately equal to a height from a lower face of the bottom portion 31 of the guide rail 11L (see FIG. 3) to an upper end face of the middle wall portion 34. The fit-in portion 61L is a region fitted in the middle wall portion 34 of the guide rail 11L.

As shown in FIGS. 4 and 6, the tubular portion 71L is formed above the drain 44. The tubular portion 71L is bridged between the front plate-like portion 42 and the rear plate-like portion 43 and is formed to cross above the drain 44. A front end side of the tubular portion 71L is open to a guide portion 52L side; a rear end side thereof communicates with the fit-in portion 61L. Inside the tubular portion 71L is formed a circular hollow portion in its section view, and the cable 22L is inserted therethrough.

Figure 8:
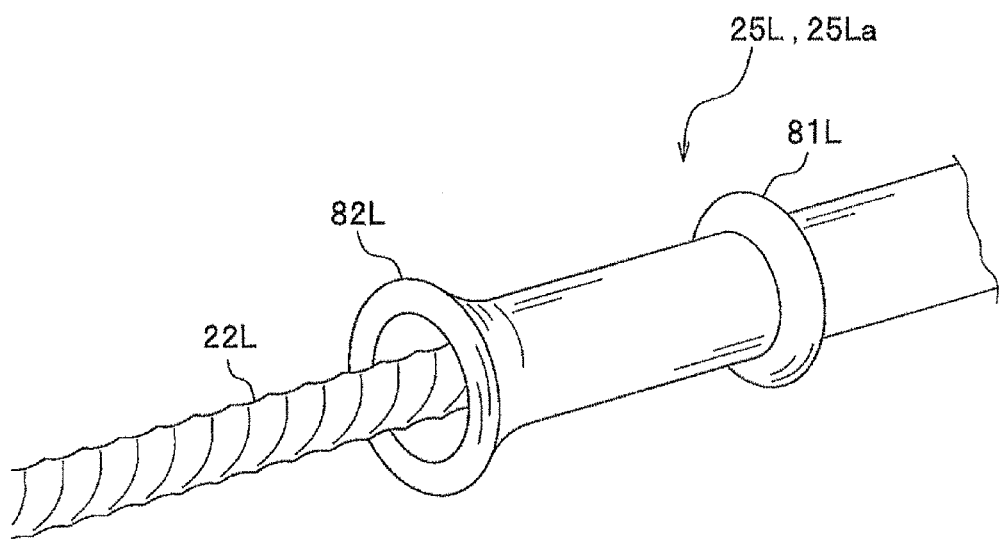
FIG. 8 is an enlarged perspective view of a rear end side of a guide pipe relating to the embodiment.

FIG. 8 is an enlarged perspective view of a rear end side of the guide pipe 25L in the embodiment. With respect to the guide pipe 25L (drive-guide-pipe portion 25La), a first protrusion portion 81L and a second protrusion portion 82L are formed on a side fronting the drain 44. The cable 22L is inserted through the guide pipe 25L.

The first protrusion portion 81L is protrudingly formed outside from the outer periphery of the guide pipe 25L. The first protrusion portion 81L is engaged with the first engagement portion 54L formed in the front frame 12. The first protrusion portion 81L may be formed so as to be engaged with the first engagement portion 54L and is not limited in its own shape and size.

The second protrusion portion 82L is formed like a taper which is gradually larger in its diameter from an outer periphery of the guide pipe 25L at an opening portion thereof. The second protrusion portion 82L is engaged with the second engagement portion 55L formed in the front frame 12. The second protrusion portion 82L may be formed so as to be engaged with the second engagement portion 55L and is not limited in its own shape and size.

Next will be described an assembly structure of the guide rail 11L, the front frame 12, and the like with respect to the embodiment. In addition, also in the assembly structure a left side structure thereof will be exemplified because the front frame 12 is approximately symmetric.

Figure 9:
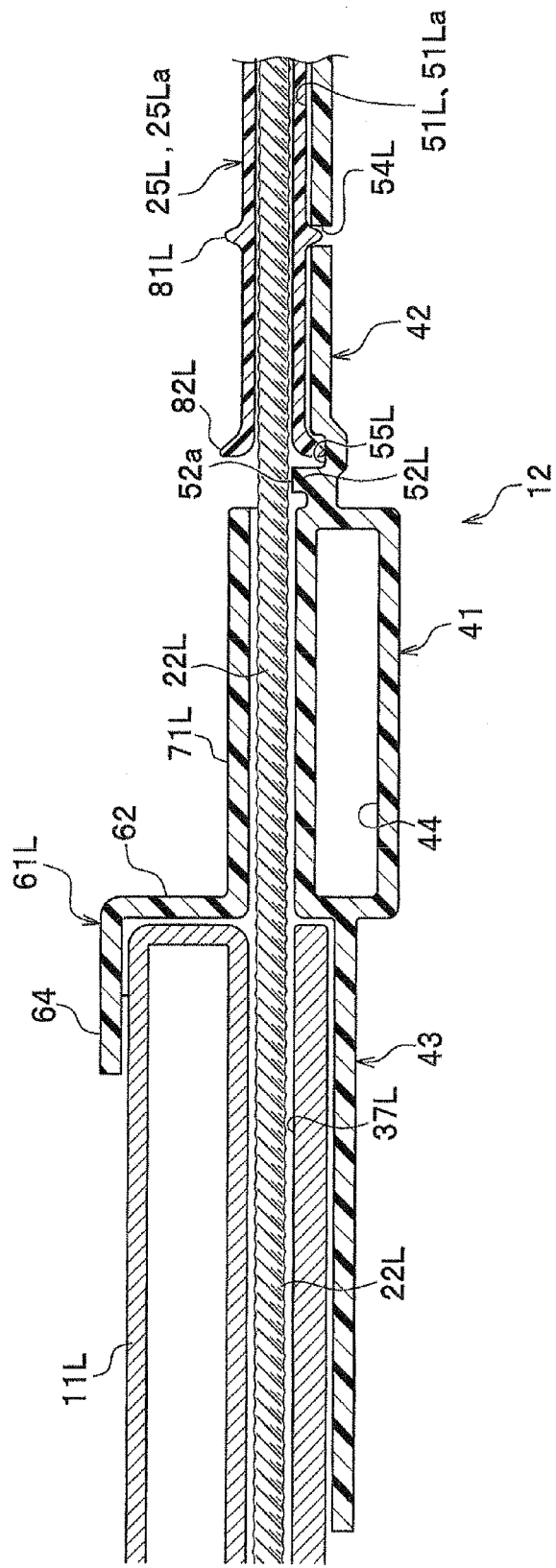
FIG. 9 is a side section view showing an assembled state of the front frame and the guide rails relating to the embodiment.

Firstly, as shown in FIGS. 2 and 9, the guide pipe 25L (drive guide pipe portion 25La) is inserted in the guide pipe groove 51L (drive-guide-pipe groove portion 51La) formed in the front frame 12 and is clipped and fixed by the clip portions 53. Furthermore, the first protrusion portion 81L of the guide pipe 25L is engaged with the first engagement portion 54L of the guide pipe groove 51L. Furthermore, the second protrusion portion 82L of the guide pipe 25L is engaged with the second engagement portion 55L of the guide pipe groove 51L. Thus the guide pipe 25L is fixed within the front frame 12.
47

Next, the guide pipe 25R (idle-guide-pipe portion 25Rb) is inserted in the guide pipe groove 51R (idle-guide-pipe groove portion 51Rb) and is fixed by the clip portions 53.

Figure 10:
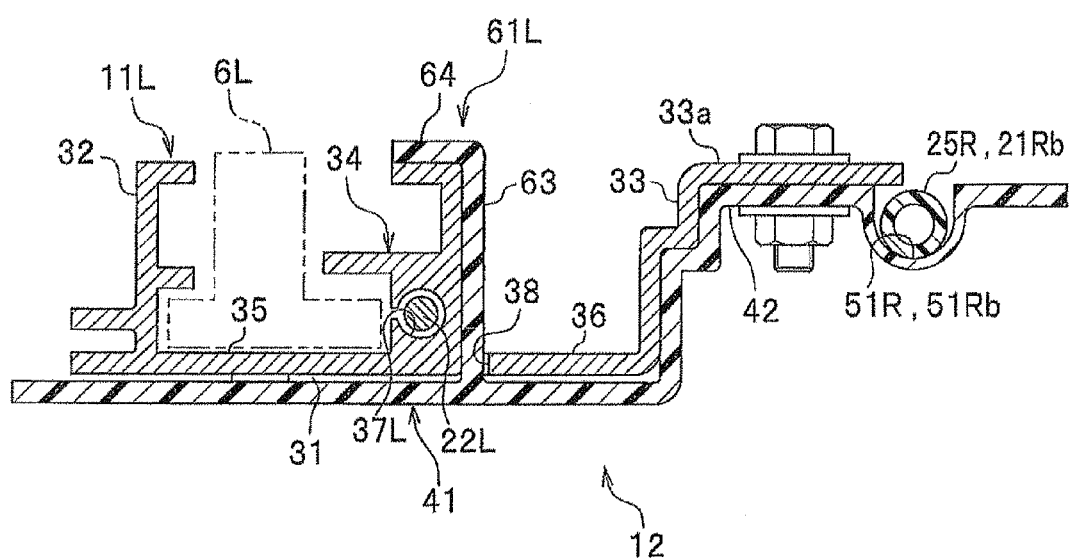
FIG. 10 is a front section view of the assembled state of the front frame and the guide rails relating to the embodiment.

Next, as shown in FIGS. 9 and 10, the rear end side of the front frame 12 is assembled to the front end side of the guide rail 11L. Namely, while the fit-in portion 61L of the front frame 12 is fitted in the middle wall portion 34 of the guide rail 11L, the upper face of the frame 12 is made to abut with the lower face of the rail 11L.

When the guide rail 11L and the front frame 12 are assembled, the outside of the middle wall portion 34 of the guide rail 11L, and the second vertically provided portion 63 and upper portion 64 of the fit-in portion 61L are made to abut with each other, and the portion 63 of the portion 61L is inserted in the slit 38. Furthermore, the bottom portion 31 of the guide rail 11L and the bottom portion 41 of the front frame 12 are made to abut. Furthermore, the extension portion 33a of the guide rail 11L and the front plate-like portion 42 of the front frame 12 are made to abut. The extension portion 33a and the front plate-like portion 42 are fastened by a bolt and nut.

Finally, while the cable 22L is inserted through the guide pipe 25L (drive-guide-pipe portion 25La), the cable 22L is inserted through the tubular portion 71L, the fit-in portion 61L, and further the cable groove 37L of the guide rail 11L. The cable 22L is exposed outside from the second engagement portion 55L, which is the rear end of the guide pipe groove 51L (drive-guide-pipe groove portion 51La), to the tubular portion 71L. At the portion where the cable 22L is exposed outside, it is configured that the cable 22L and the upper face 52a of the guide portion 52L contact and the cable 22L passes through the center of the guide pipe 25L.

In addition, in the embodiment, although assembling is made as above, an assembling procedure is not limited thereto.

According to the embodiment thus described, because the first engagement portion 54L and the second engagement portion 55L for engaging the guide pipe 25L are provided in the guide pipe groove 51L, it is not necessary to provide an engagement member in the drain 44 of the front frame 12 as conventional. Thus it is possible to prevent a drainage flow of the drain 44 from being interrupted. Furthermore, because only the front frame 12 and the guide rail 11L can be assembled in a state of the guide pipe 25L being engaged in the guide pipe groove 51L in advance, it is possible to enhance the assembling property of the frame 12 and the rail 11L.

Furthermore, because the guide rail 11L and the front frame 12 can be fitted in through the fit-in portion 61L formed in the frame 12, it is possible to further enhance the assembling property of the frame 12 and the rail 11L.

Furthermore, in the front frame 12, because the guide portion 52L for guiding the cable 22L is formed at a region where the cable 22L is exposed from the guide pipe 25L, it is possible to align the cable 22L with respect to the pipe 25L.

Thus although the embodiment of the present invention has been described, it can be changed appropriately in design within the spirit and scope of the invention. For example, in the embodiment the front frame 12 for connecting the front side of a vehicle is exemplified, a member for connecting the rear side of the vehicle is also available and applicable. Furthermore, in the embodiment, although two pairs of the engagement portions 54, 55 and the protrusion portions 81, 82 are provided, at least one pair is available and applicable.

Furthermore, although the fit-in portions 61 are formed as described in the embodiment, those are not limited thereto; those may be a mode where the front frame 12 and the guide rails 11 can be fitted therein. Furthermore, if the drive device 4 has a configuration of being able to move the sunroof panel 3 through the cables 22, other modes are also available and applicable.

Furthermore, in the embodiment, although the guide pipe groove 51L and the guide pipe 25L are arranged from the drive device 4 to nearly before the drain 44 (front side), the embodiment is not limited thereto. For example, the guide pipe groove 51L and the guide pipe 25L shown in FIG. 9 may also be extended to above the drain 44 and be arranged so as to separate the bottom plate portion 41 and the guide pipe groove 51L.

More in detail, the guide pipe groove 51L and the guide pipe 25L are extended to above the drain 44; and the guide portion 52L, engagement portions (for example, first engagement portion 54L, second engagement portion 55L) and protrusion portions (for example, first protrusion portion 81L, second protrusion portion 82L) may also be formed to be separated from the bottom plate portion 41 and to be positioned above the drain 44.

Even such a configuration does not interrupt a drainage property because there exists a gap between the drain 44 (bottom plate portion 41) and the guide pipe groove 51L.

What is claimed is:
1. A frame structure of a sunroof apparatus comprising:
a pair of guide rails provided, respectively, on both sides in a width direction of an opening of a vehicle and configured to guide a movement of a sunroof panel;

a frame including a drain extended across the width direction of the vehicle and configured to connect ends of the guide rails with each other;

sliders attached to the sunroof panel and configured to slide in the guide rails, respectively;

drive device installed at the frame and configured to make the sliders slide;

cables configured to connect the sliders, respectively, and the drive device and to be routed to cross above the drain;

guide pipes configured to cover the cables, respectively; and guide pipe grooves depressingly provided at the frame and where the guide pipes are arranged, respectively, wherein protrusion portions configured to protrude outside from outer peripheries of the guide pipes are provided, respectively, wherein engagement portions with which the protrusion portions are engaged are formed, respectively, in the guide pipe grooves, and wherein tubular portions configured to cross above the drain and to insert the cables, respectively, therethrough are formed in the frame, and one end of each tubular portion is configured to front the guide pipes and the guide pipe grooves, respectively, and the other end of each tubular portion is configured to front the guide rails, respectively.

2. The frame structure of the sunroof apparatus according to claim 1, wherein fit-in portions configured to be fitted in ends of the guide rails are formed, respectively, on the other end of each tubular portion, and wherein the cables are configured to be inserted inside the fit-in portions, respectively.

3. The frame structure of the sunroof apparatus according to claim 1, wherein in frame guide portions configured to guide the cables are formed in the frame at regions between the guide pipe grooves and the one end of each tubular portion, and to which the cables are exposed from the guide pipes, respectively.

4. The frame structure of the sunroof apparatus according to claim 2, wherein in frame guide portions configured to guide the cables are formed at regions between the guide pipe grooves and the one end of each tubular portion, and to which the cables are exposed from the guide pipes, respectively.

* * * * *